United States Patent [19]

Martorell

[11] Patent Number: 4,873,820
[45] Date of Patent: Oct. 17, 1989

[54] PORTABLE VIBRATING APPARATUS FOR THE COLLECTION OF FRUITS

[75] Inventor: D. Aurelio T. Martorell, Tarragona, Spain

[73] Assignee: Geiver, S.A., Ulldecona, Spain

[21] Appl. No.: 280,639

[22] Filed: Dec. 6, 1988

[51] Int. Cl.$^4$ .......................................... A01D 46/00
[52] U.S. Cl. ................................................... 56/340.1
[58] Field of Search .................. 56/340.1, 12.4, 10.1, 56/10.2, 12.6, 14.7, 328.1

[56] References Cited

U.S. PATENT DOCUMENTS

| | | | |
|---|---|---|---|
| 3,650,099 | 3/1972 | Sitter | 56/340.1 |
| 3,696,597 | 10/1972 | Sitter | 56/340.1 |
| 3,796,031 | 3/1974 | Fridley et al. | 56/340.1 |
| 3,924,390 | 12/1975 | Alexander | 56/340.1 |
| 4,031,622 | 6/1977 | Alexander | 56/340.1 X |

*Primary Examiner*—Thuy M. Bui
*Attorney, Agent, or Firm*—Abelman Frayne Rezac & Schwab

[57] ABSTRACT

A portable device for shaking the branches of trees to dislodge fruits or nuts, has a drive motor which is coupled to a reciprocatable rod through a gear transmission including a centrifical clutch and a linkage including a ball and socket joint incorporating a needle bearing, a hook shaped member on an extension rod being detachably attachable to the reciprocatable rod.

1 Claim, 2 Drawing Sheets

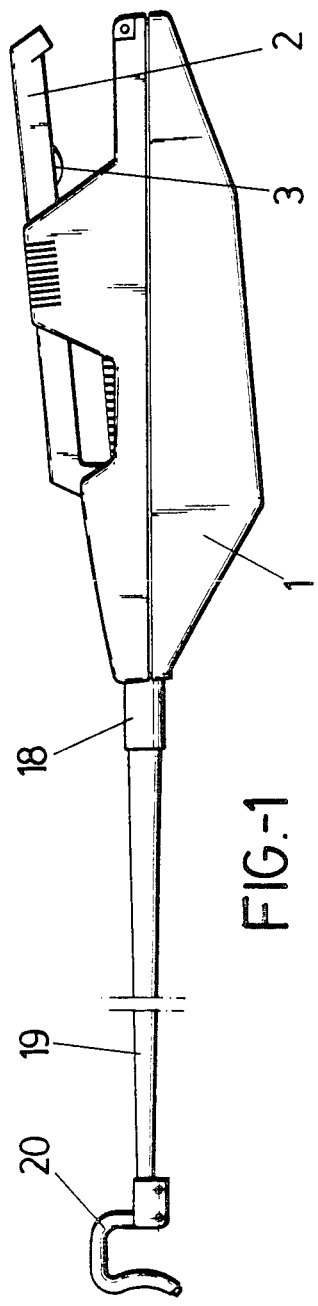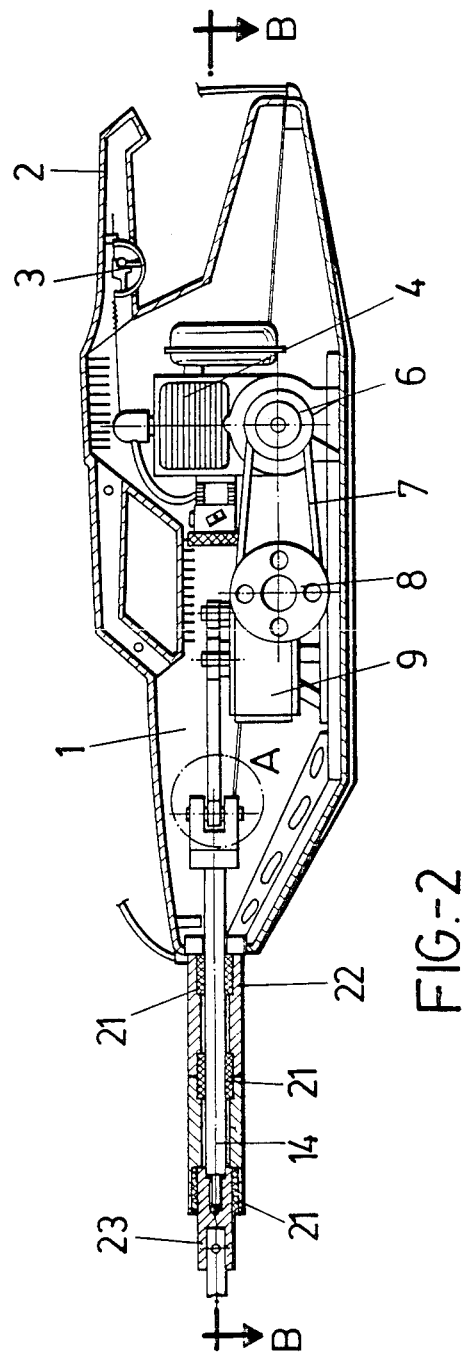

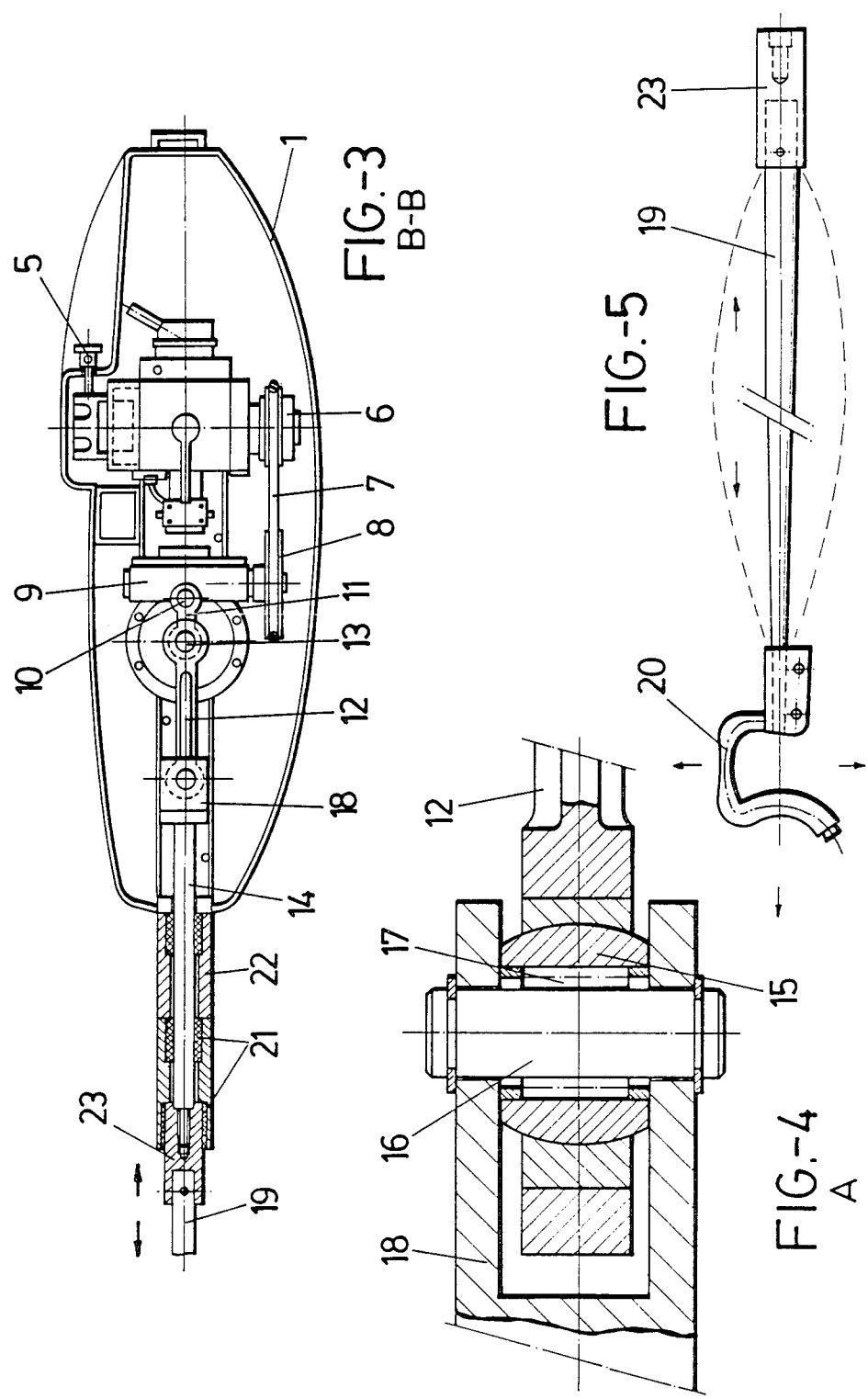

PORTABLE VIBRATING APPARATUS FOR THE COLLECTION OF FRUITS

OBJECT OF THE INVENTION

The present invention relates to a portable vibrating apparatus for the collection of fruits, specially designed for the detachment of olives from the branches of the olive trees. Its application extends to all types of dry fruits, such as almonds, filberts, nuts as well as fruits intended for the production of juices, jams, etc.

The vibrating apparatus is manual, that is, it will be handled by an operator and includes a motor which through a transmission produces a linear movement in an output shaft to which is coupled a rod by whose free end it is adjusted to one of the branches of the tree and the vibratory movements obtained give rise to the consequent vibration of the branches and hence to the detachment of the fruits hanging on them.

BACKGROUND OF THE INVENTION

At the present the harvesting of certain fruits, and concretely olives, entails a number of expenses which, carefully analyzed, do not let the farmer, in this case the olive grower, cover the expenses arising from the preparation, treatment and consequent harvesting of the olives, all as a result of the fact that this harvesting is done most often manually and wages are at present very high.

Therefore, the only profitable way for the olive growers is to use in the harvesting machines which replace the labor, and undoubtedly there are devices or machines which fulfill these purposes.

In this sense we may cite the type of machines based on tongs which are clamped onto the trunk of the olive tree and by means of a corresponding motor for driving these tongs to produce a vibration thereof and consequently the vibration of the olive tree or other tree, causing the fruit to fall.

This method involves a greater deterioration of the tree, since that vibration to which the trunk is subjected in order that the branches will move and the fruits detach causes small roots to break, and the recovery of the tree is very slow, it having been shown and proven that the olive trees treated in this manner for olive harvesting produce approximately half as much the year following the treatment with this type of machine.

The machines referred to, therefore, regardless of whether they are complex and high-priced apparatus, present the afore-mentioned disadvantages.

To solve these problems, also cheaper machines have been devised, that is, simple machines which perform a direct vibration on the branches of the trees in order not to damage the roots, these simpler machines being based on a motor which through an adequate transmission produces a reciprocating movement in an output arm whereby precisely the vibration of the branches occurs.

These simple machines, although economical and generally efficient, are not made very scientifically, that is, they are manufactured practically in the manner of a craftsman, without thinking of their efficiency and possible maintenance. That is to say, the machines break down very easily as they are not properly researched and engineered with respect to the characteristics and layout and mounting of their elements.

DESCRIPTION OF THE INVENTION

The vibrating apparatus which the invention proposes has been designed to solve this nexus of problems to full satisfaction, it being based on the type of simple apparatus cited above, but with a number of improvements whereby a totally efficient apparatus is obtained, free from defects and economical to purchase.

More concretely, the apparatus in question is of small size and of great power, able to detach the fruits easily from the trees, having an casing, preferably of glassfiber reinforced polyamide, inside of which an internal combustion engine has been provided whose output shaft is coupled to a centrifugal clutch formed by elements of treated steel, whereby an idling at less than 1,500 revolutions per minute can be maintained.

The transmission which proceeds from said clutch is made up of an elastic belt of reinforced rubber, combined with a pulley to constitute the transmission, the latter being associated with a reducing device which, by means of a connecting rod-crank assembly, transmits a reciprocating linear movement, or, what amounts to the same thing, a forward and backward movement, to a vibrating shaft of treated steel, and to whose output is coupled, interchangeably, a vibrating rod which terminates in a special configuration to adapt to the branches and to permit the vibration thereof whenever the motor (engine) of the apparatus is set in motion, all in such a manner that the end of the vibrating rod, for its adaptation to the branch, permits duly fastening (it) to the latter without producing the least deterioration therein.

The weight of this entire apparatus does not exceed seven kilograms, so that it can be used manually in a convenient manner by an operator, having also means for carrying it on the back, like a knapsack.

One of the fundamental characteristics of this apparatus is centered in the form or means which articulate to each other the connecting rod and the shaft to which the vibrating rod is coupled, this articulation being focused by a ball and socket which is traversed by a bolt anchored in the forked end of the shaft to which the vibrating rod is coupled, and between this ball joint and bolt a needle cage has been mounted, all of which facilitates effective articulation without any problems, as the design of the articulation is basic, due to the fact that there will be a continuous reciprocating vibratory movement while the apparatus is in operation.

DESCRIPTION OF THE DRAWINGS

To complement the description being made and for better comprehension of the characteristics of the invention, this specification is accompanied, as an integral part thereof, by a set of drawings showing, by way of nonlimiting illustration, the following:

FIG. 1 shows a general view of the vibrating apparatus of the invention in which can be seen the main body thereof, as well as the rod with its articulated end and the shaft which transmits the movement from the motor integrated in the general body of the apparatus.

FIG. 2 shows a view according to a longitudinal section of the apparatus represented in the preceding figure.

FIG. 3 shows a view which corresponds to another longitudinal section of the same apparatus, according to a section through a plane perpendicular to the section of the preceding figure.

FIG. 4 shows an enlarged view corresponding to the framed detail with the letter A of FIG. 1 and which corresponds to the articulation between the connecting rod and the shaft to which the reciprocating movement is transmitted.

FIG. 5 shows, lastly, a longitudinal view of the vibrating rod which at one of its ends comprises the means for coupling to the vibration shaft and at its opposite end the means for adaptation to the tree branch, all according to a preferred form of realization, as this means of adaptation to the branch may present any other suitable configuration.

PREFERRED REALIZATION OF THE INVENTION

These figures illustrate how the apparatus proposed by the invention constitutes a general casing or body 1 of small size and on which a handle 2 is established for its operation with a switch 3 for starting the respective motor 4, the latter being located inside the general casing 1 of the apparatus.

Although the apparatus in question can be started by electric ignition, obviously it may also have a cable type starter 5.

In any event, the motor 4 carries on its respective output shaft a centrifugal clutch 6 connected to a pulley through which and by means of a V-belt 7 the movement is transmitted to a pulley 8 whose mounting axle corresponds to the shaft of a reducing gear 9 with vertical output shaft 10 and on which shaft is coupled a crank 11 of variable radius, according to the use of the apparatus, and on the end of this crank a correcting rod 12 is coupled, according to the articulation 13, and on its other end there is another articulation for connection to the shaft 14 which will be the one which moves in reciprocating direction, that is, according to linear displacement caused by the movements of the crank 11 and connecting rod 12.

The articulation between the correcting rod 12 and the shaft 14 is formed by a ball and socket 15 inside of which and making contact on the bolt 16 a needle cage 17 has been provided, the bolt 16 being precisely what retains the socket 15 at the forked end 18 of said shaft 14, the provision having been made that on that shaft 14 there is coupled in turn, removably, a rod 19 which ends in a hook element or grip 20 to adapt itself to the branches and transmit to them the reciprocating movement produced.

The dual bearing mechanism cited above, as can be seen in FIG. 4, is considered vital to ensure a correct life of the mechanism and to absorb misalignments and sudden shocks, with the further particularly that the shaft which forms the articulation 13 between connecting rod and crank is treated and chromium-plated through a flanging system, made with materials of high resistance to shock and to fatigue and adequately treated. This articulation shaft, through said connecting rod-crank drive mechanism, imparts a linear reciprocating movement which is utilized to impart to the branches of the trees, through the rod 19, the corresponding vibratory movement to produce the falling of the fruit.

The shaft 14 is mounted and guided on linear bearings 21 lodged in the supporting barrel 22. As to the union between rod 19 and shaft 14, it is obtained through a sleeve 23 fastened with corresponding pins.

The grip or hook 30 provided at the end of rod 19 is adapted to be taken off to exchange it for others that suit the needs of the moment.

It is not considered necessary to make this description more extensive for any expert in the matter to understand the scope of the invention and the advantages that derive therefrom.

The materials, form, size and arrangement of the element may vary provided this does not mean an alteration of the essence of the invention.

The terms in which this specification has been described should always be taken in a wide and non-limiting sense.

I claim:

1. Portable vibrating apparatus for the collection of fruits, which having been designed to produce oscillating movements on the branches of certain fruit trees, preferably olive trees and dry fruit trees, to obtain the detachment of the fruits and their respective fall, and being provided to be handled manually be an operator, consisting of a general casing in which there is a motor which drives a transmission to produce a reciprocating movement in a shaft to which is coupled a rod through which there will be produce the beating or vibration of the branches of the tree in question, is essentially characterized in that between the output shaft of the motor and the corresponding transmission system, formed by a pulley and V-belt, a centrifugal clutch has been provided, while at the output of said transmission device the corresponding reducing gear has been provided whose output shaft is disposed vertically to articulate thereon a crank of variable radius on whose other end there articulates a correcting rod which is hinged by its free end to the corresponding shaft that receives the reciprocating movement, to which shaft is coupled in turn axially a rod through which the branches of the tree are beaten; the provision ahving been made that the articulation between the connecting rod and the shaft subjected to reciprocating movement is materialized by a ball and socket between which and the corresponding retention bolt thereof a needle cage has been provided, said socket being disposed at a forked end belonging to the shaft intended to receive said reciprocating movement; with the further particularity that the coupling between the latter and the rod occurs through a sleeve inserted between both parts, permitting the removal of that rod from the shaft; being characterized further in that on the free end of the rod there has been provided, removably, an element functioning as hook or grip for its adaptation to the branches of the trees, in order that the reciprocating movement transmitted to the rod will produce the oscillatory movement of the branches and consequently the detachment of the fruit.

* * * * *